J. A. DAVIDSON.
LEVELING CASTER.
APPLICATION FILED FEB. 17, 1912.

1,068,485.

Patented July 29, 1913.

Witnesses
O. M. Hinrich
A. S. Dennison

Inventor
John Albert Davidson
By A. Miller Belfield
Atty.

UNITED STATES PATENT OFFICE.

JOHN ALBERT DAVIDSON, OF CHICAGO, ILLINOIS.

LEVELING-CASTER.

1,068,485. Specification of Letters Patent. Patented July 29, 1913.

Application filed February 17, 1912. Serial No. 678,181.

*To all whom it may concern:*

Be it known that I, JOHN ALBERT DAVIDSON, a citizen of the United States, residing at Chicago, in the county of Cook and State of Illinois, have invented a certain new and useful Improvement in Leveling-Casters, of which the following is a full, clear, concise, and exact description, reference being had to the accompanying drawings, forming a part of this specification.

My invention relates to a leveling caster and has as its object the provision of a device which will serve either as a firm base for a heavy article such as a piece of furniture, or which device may be adjusted to present a rolling contact with the floor for moving the article.

Another object of my invention is to provide a device which may be conveniently attached to a piece of furniture and at the same time be readily adjusted to level such a piece of furniture.

A further object of my invention resides in the particular arrangement and combination of parts hereinafter described.

Figure 1:
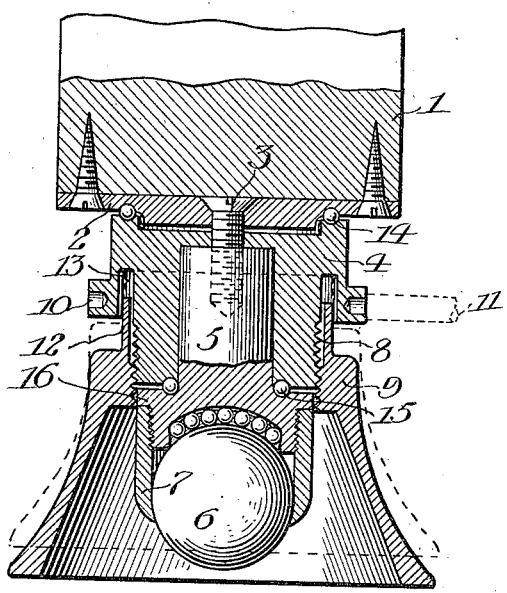
Figure 2:
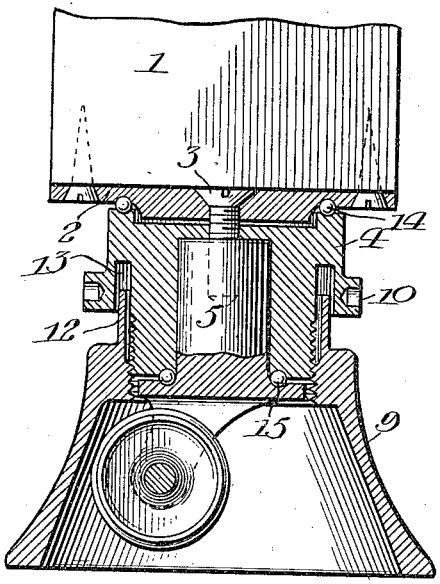

In the accompanying drawing Figure 1 is a vertical cross sectional view through the center of my device showing the use of the common ball caster in connection therewith; while Fig. 2 is a view similar to Fig. 1, showing the use of the ordinary roller caster therewith.

Throughout the separate views the same part is designated by the same reference numeral.

Referring more particularly to the drawings, 1 is intended to represent the leg of a billiard table, piano or other heavy article of furniture; 2 is a plate attached to the leg 1, by means of screws as shown. Plate 2 is preferably circular, although other forms may be used, and is provided with a central aperture through which a screw 3 is passed. This screw is shown as of the ordinary machine type, although other special forms may be used if desired. Screw 3 passes through a central aperture in a hub 4, and has screw threaded engagement with a central stud 5. Screw 3 has no engagement with the hub 4. At the lower part of the stud 5 is mounted a ball 6 which is held to the member 5 by means of a screw threaded cylinder 7 which is shown as having its lower edge crimped inward to engage the face of the ball. The particular arrangement of ball and support, however, is immaterial to my invention. The lower exterior surface of the hub 4 is provided with screw threads as shown at 8, for the purpose of engaging a screw threaded supporting element or bell 9. When my device is applied to an article of furniture the bell 9 normally stands in engagement with the floor, but I provide means whereby the relation of the bell 9 to the hub 4 may be varied so as to bring the ball 6 into engagement with the floor, so that the furniture may be readily moved. My means for accomplishing this result is to provide the exterior face of the hub 4 with a number of sockets as 10, which may be engaged by a suitable lever as 11. However, other suitable means of turning the hub 4 may be adopted, such as a special spanner wrench, or the exterior of the hub may be made hexagonal, for the accommodation of the ordinary hand wrench. The bell 9 is provided with an inwardly projecting flange 12 which projects into an annular socket 13 in the hub 4, and covers the screw threads 8. This arrangement enhances the appearance of my device and also protects these threads from damage. As shown in full lines in Fig. 1, the bell is in a position for contacting with the floor. In such a position the device may sustain considerable weight, and in order to render the device easy of operation I provide a roller bearing 14 between the plate 2 and the hub 4, and also a roller bearing 15 between the hub 4 and the stud 5, the stud being provided with a flange such as 16 to better accommodate this bearing. It will be understood, however, that other forms of bearings may be adopted as desired. When it is desired to move any furniture to which my device is attached the hub 4 is operated to bring the bell 9 into the position indicated by dotted lines in Fig. 1, whereupon it will be readily seen that the ball 6 will be in contact with the floor and my device will operate as an ordinary caster.

Referring more particularly to Fig. 2, it will be seen that I have illustrated therein an ordinary wheel caster as incorporated into my device. The operation and position of the parts is not altered by this substitution of the wheel caster for the ball caster.

It is well known by those having to do with heavy pieces of furniture that the ordinary caster is apt to injure the floor when used therewith, owing to the insufficient supporting surface afforded by the caster. In my device such injury will be done away with, since the weight of the piece of furniture would normally be taken by the bell 9 and the caster portion of my device would be in contact with the floor only when it is desired to move the furniture. For a short period of time, such as is required for moving purposes, the average floor is sufficiently strong to sustain the weight of most pieces of furniture. My device is also particularly useful wherever it is desired to level an article of furniture irrespective of the weight which may be on the device. In such use of my device for leveling purposes the caster will not come into use at all, since the caster is not in contact with the floor. Consequently the caster may be omitted from the device whenever it is not desired to move the piece of furniture from one spot to another, but merely to level the furniture.

It will be understood that while I have shown and described the preferred form of my invention, that changes and modifications may be made therein without departing from the spirit of my invention, and that I contemplate all such rearrangements as are mechanically equivalent to my device described herein. More especially it will be apparent to those skilled in the mechanical arts that the particular form of my supporting bell is immaterial and that it may be made in various forms without altering its relation to the device as a whole.

Having thus described my invention, what I claim and desire to secure by Letters Patent is:

1. In a device of the class described in combination, a caster, a hub having rotatable engagement with said caster, and a supporting element having an adjustable connection with said hub, whereby said caster may be lifted out of contact with the floor.

2. In a leveling caster in combination, a member adapted to be attached to a piece of furniture, a hub having rotatable connection with said member, a caster mounted partially within said hub, and a supporting member having an adjustable connection with said hub whereby said caster may be lifted from the floor.

3. In a leveling caster in combination, a plate for attachment to an article of furniture, a hub provided with a recess, a caster engaging said recess, a connecting member passing through a portion of said hub and uniting said plate with said caster, and a sustaining member having screw threaded engagement with said hub.

4. A device for use with articles of furniture comprising in combination, a member for attachment to the furniture, a rotatable hub, means for securing said hub to said member at a fixed distance therefrom, and a supporting bell threaded to said hub.

5. A device of the class described comprising in combination, a stud having a rotatable supporting member and having a horizontally projecting surface, means for suspending said stud from a piece of furniture, a hub provided with a recess inclosing a portion of said stud, said hub having rotatable engagement with said surface, and a sustaining member having an adjustable connection with said hub.

6. In a leveling caster in combination, a plate adapted to be attached to a piece of furniture and having an aperture therein, a screw positioned in said aperture, a caster attached to said screw, a hub having a recess therein for reception of said caster, a bearing between said plate and said hub, a bearing between said caster and said hub, and a sustaining bell adjustably connected to said hub.

7. In a device of the class described in combination, a caster provided with a stud, a rotatable hub having a recess within which said stud projects, and a supporting element threaded to the exterior of said hub.

8. A device for use with articles of furniture, comprising in combination, a plate for attachment to the furniture, a rotatable hub, a bearing between said hub and said plate, means for securing said hub to said plate at a fixed distance therefrom, and a supporting bell threaded to said hub.

9. In a device of the class described in combination, a caster, a hub rotatably mounted with respect to said caster, and a supporting element adapted to contact with the floor having a screw threaded connection with said hub whereby said caster may be lifted out of contact with the floor.

10. A device for use with articles of furniture, comprising in combination, a plate for attachment to the furniture, a rotatable hub provided with a recess, a ball bearing between said hub and said plate, a stud within said recess, a screw threaded into said stud for holding the stud to said plate, and a supporting bell threaded to said hub.

11. In a device of the class described in combination, a piece of furniture, a caster, means for holding said caster at a fixed distance from said piece of furniture, a supporting bell connected to said furniture but disconnected from said caster, and means for adjusting the distance of said bell from the furniture.

12. In a device of the class described in combination, a plate adapted to be fixed to a piece of furniture, a caster suspended at a fixed distance from said plate, a supporting bell suspended from said plate but disconnected from said caster, and means for adjusting the distance between said bell and said plate.

13. A device for use with articles of furniture comprising in combination, a plate for attachment to the furniture, a rotatable hub provided with a recess and having a bearing between itself and said plate, a stud within said recess, means for supporting said stud from said plate, and a supporting bell threaded to said hub.

14. The combination of a member adapted to be attached to an article of furniture, a rotatable hub supported from said member having a recess, a caster partly within said recess in said hub, and a supporting element inclosing the lower part of said caster and having screw threaded engagement with the exterior of said hub.

In witness whereof, I hereunto subscribe my name this 14th day of February, A. D., 1912.

JOHN ALBERT DAVIDSON.

Witnesses:
A. L. JONES,
A. S. DENNISON.

Copies of this patent may be obtained for five cents each, by addressing the "Commissioner of Patents, Washington, D. C."